United States Patent
Schuh et al.

(10) Patent No.: US 9,373,875 B2
(45) Date of Patent: Jun. 21, 2016

(54) STORAGE ELEMENT FOR A SOLID ELECTROLYTE ENERGY STORE

(71) Applicant: Siemens Aktiengesellschaft, Munich (DE)

(72) Inventors: Carsten Schuh, Baldham (DE); Thomas Soller, Landau/Isar (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 104 days.

(21) Appl. No.: 14/356,444

(22) PCT Filed: Oct. 17, 2012

(86) PCT No.: PCT/EP2012/070569
§ 371 (c)(1),
(2) Date: May 6, 2014

(87) PCT Pub. No.: WO2013/068218
PCT Pub. Date: May 16, 2013

(65) Prior Publication Data
US 2014/0295297 A1    Oct. 2, 2014

(30) Foreign Application Priority Data

Nov. 9, 2011  (DE) .................. 10 2011 086 028

(51) Int. Cl.
*H01M 12/08* (2006.01)
*H01M 12/06* (2006.01)
(Continued)

(52) U.S. Cl.
CPC ............ *H01M 12/08* (2013.01); *H01M 4/0409* (2013.01); *H01M 4/0414* (2013.01); *H01M 4/134* (2013.01); *H01M 4/48* (2013.01);
(Continued)

(58) Field of Classification Search
CPC ... H01M 12/08; H01M 12/06; H01M 4/8626; H01M 4/0409; H01M 4/48; H01M 4/0414; H01M 4/134; H01M 2300/0071; Y02E 60/122; Y02E 60/50; Y02P 70/54
IPC ................ H01M 12/08, 12/06, 4/0409, 4/0414, H01M 4/134, 4/48, 2300/0071; Y02E 60/122, Y02E 60/50; Y02P 70/54
See application file for complete search history.

(56) References Cited

U.S. PATENT DOCUMENTS 2,627,531 A    12/1948 Vogt
3,849,202 A *  11/1974 Pompon ................ H01M 8/225
                                                      29/623.2

(Continued)

FOREIGN PATENT DOCUMENTS

CH    278111 A      9/1951
DE    19624887 A1   1/1997

(Continued)

OTHER PUBLICATIONS

The Free Dictionary (Wire entry (c) 2011 taken as published Dec. 2011 {http://www.thefreedictionary.com/wire}).*

*Primary Examiner* — Patrick Ryan
*Assistant Examiner* — Aaron Greso
(74) *Attorney, Agent, or Firm* — Beusse Wolter Sanks & Maire

(57) ABSTRACT

A storage element for a solid electrolyte energy store and a method of producing a storage element are provided. The storage element has a three-dimensional grid structure made of a material that comprises an electron-conducting redox pair.

12 Claims, 3 Drawing Sheets

(51) Int. Cl.
*H01M 4/04* (2006.01)
*H01M 4/134* (2010.01)
*H01M 4/48* (2010.01)
*H01M 4/86* (2006.01)

(52) U.S. Cl.
CPC ............ *H01M4/8626* (2013.01); *H01M 12/06* (2013.01); *H01M 2300/0071* (2013.01); *Y02E 60/122* (2013.01); *Y02E 60/50* (2013.01); *Y02P 70/54* (2015.11)

(56) References Cited

U.S. PATENT DOCUMENTS

| | | | | |
|---|---|---|---|---|
| 5,015,344 A | * | 5/1991 | Nidola | C25B 9/10 204/252 |
| 2002/0098406 A1 | * | 7/2002 | Huang | H01M 4/8605 429/487 |
| 2002/0168555 A1 | * | 11/2002 | Mukerjee | C23F 13/02 429/442 |
| 2003/0049517 A1 | * | 3/2003 | Hampden-Smith | B01J 2/02 429/406 |
| 2005/0095497 A1 | * | 5/2005 | Yamada | H01M 4/8621 429/483 |
| 2006/0063051 A1 | | 3/2006 | Jang | |
| 2006/0204829 A1 | * | 9/2006 | Ovshinsky | H01M 4/8652 429/421 |
| 2013/0034784 A1 | | 2/2013 | Landes et al. | |
| 2013/0183595 A1 | | 7/2013 | Greiner et al. | |

FOREIGN PATENT DOCUMENTS

| | | |
|---|---|---|
| DE | 102009057720 A1 | 6/2011 |
| DE | 102010041019 A1 | 3/2012 |
| EP | 0484605 A1 | 5/1992 |

* cited by examiner

STORAGE ELEMENT FOR A SOLID ELECTROLYTE ENERGY STORE

CROSS REFERENCE TO RELATED APPLICATIONS

This application is the US National Stage of International Application No. PCT/EP2012/070569 filed Oct. 17, 2012, and claims the benefit thereof. The International Application claims the benefit of German Application No. DE 102011086028.2 filed Nov. 9, 2011. All of the applications are incorporated by reference herein in their entirety.

FIELD OF INVENTION

The present invention relates to a storage element for a solid electrolyte energy store and to a method for the production thereof. In addition, the invention relates to a solid electrolyte energy store.

BACKGROUND OF INVENTION

Energy stores for storing and delivering electrical energy are of great importance for example for many mobile applications. While the storage capacity of modern energy stores for storing electrical energy is sufficient for the operation of relatively small devices, such as cell phones, portable computers, etc., energy stores for storing electrical energy for larger applications, such as for example electrically driven motor vehicles, still have shortcomings that stand in the way of their commercially successful use. In particular, the storage capacity of the batteries used does not yet meet the desired requirements. Although, for example, lithium-ion batteries achieve good results for use in cell phones or computers for instance, they are only suitable to a limited extent for applications requiring a large amount of energy, such as for example electrically operated motor vehicles. The storage capacity of the lithium-ion batteries represents a limiting factor here, for example for the range of an electric motor vehicle.

In particular in the motor vehicle sector, there are also known systems in which the energy necessary for propulsion is stored chemically in the form of hydrogen. By means of a fuel cell, the hydrogen is then converted into electric current, by which the engine can be driven. For such technology, however, the setting up of a network of filling stations for hydrogen is necessary, which makes the introduction of this technology expensive, in particular in view of the high safety requirements for the filling stations because of the risk of explosion.

More recently, batteries in which the electrical energy is stored in the form of a reversible redox process between a metal and oxygen have also additionally been considered. The structure of such a battery corresponds approximately to a fuel cell with a solid electrolyte. They are therefore also referred to as solid electrolyte batteries or metal-air batteries. The electrolyte is arranged between two electrodes, one of which is an air electrode, which consists of a material that splits the atmospheric oxygen and conducts the oxygen ions thereby produced to the electrolyte. The electrolyte is likewise produced from a material that can conduct oxygen ions. Arranged on the opposite side thereof from the air electrode is the second electrode, which consists of a metal or metal oxide to be oxidized and reduced. The battery is discharged by the metal being oxidized by means of oxygen ions from the atmospheric oxygen and is charged by the metal being reduced and giving off oxygen ions when a voltage is applied, the oxygen ions then migrating through the electrolyte to the air electrode, from where they are given off to the surroundings as molecular oxygen. This process is schematically represented in FIG. 1, in which the upper half represents the discharging process and the lower half represents the charging process. In this figure, the reference numeral 1 denotes the battery, the reference numeral 3 denotes the air electrode, the reference numeral 5 denotes the metal or metal oxide, the reference numeral 7 denotes the electrolyte, the reference numeral 9 denotes a load that is supplied with current when the battery is discharged, and the reference numeral 11 denotes a power source, which is used when charging the battery. The electrolytes used in the batteries display a highly selective-oxygen-ion conduction, but require relatively high operating temperatures of typically 600° C. or more.

Recent developments in the area of solid electrolyte batteries have led to the second electrode no longer being used itself as a storage medium, providing instead an additional storage medium that is formed from the redox pair. An additional, fluidic redox pair is then provided, implementing the mass transfer between the second electrode on the one hand and the storage medium on the other hand. This allows the power density and the capacity of the solid electrolyte batteries to be increased.

The previous design of the storage elements is based on a skeletal structure with a high open porosity. To reduce the sintering tendency at the operating temperatures prevailing in the solid electrolyte batteries, iron particles known as ODS iron particles (ODS: Oxide Dispersion Strengthened) are used.

SUMMARY OF INVENTION

It is an object of the present invention to provide an advantageous storage element for a solid electrolyte energy store and also a method for the production thereof.

It is a further object of the present invention to provide an advantageous solid electrolyte energy store.

The first object is achieved by a storage element and a method as claimed. The second object is achieved by a solid electrolyte energy store as claimed. The dependent claims contain advantageous refinements of the invention.

A storage element according to the invention for a solid electrolyte energy store has a three-dimensional lattice structure of a material that comprises an electron-conducting redox pair. The lattice structure may, for example, have layers of elements in rod form. Within a layer, the elements in rod form are then respectively aligned along a preferential direction, the preferential directions of neighboring layers differing from one another in their orientations.

The lattice structure represents an alternative to the skeletal structure with high open porosity. It makes it possible for the fluidic redox pair and any further process gases to gain rapid access to large surface regions of the storage element, without the necessity of addressing limiting transporting processes, as is necessary in the case of the highly porous skeletal structures. The rapid access to the surface regions makes it possible for a charge to be uniformly transported by means of the fluidic redox pair to the surface regions of the storage element and away from the surface regions of the storage element. This allows a simultaneous and uniform "activation" of the storage volume to be achieved.

If the lattice structure has the described layers of elements in rod form, the preferential directions of neighboring layers may respectively differ from one another by a predetermined angle. By suitable choice of the angle by which the preferential directions of neighboring layers respectively differ from one another, the rate of the fluid flow through the lattice structure and the flow paths through the lattice structure can be set. If the angle by which neighboring layers respectively differ from one another is a divisor of 180 degrees, for example an angle of 90 degrees, a periodic distribution of the orientation of neighboring layers in the stacking direction of the layers can be achieved.

The redox pair of the storage element may comprise at least one metal/metal oxide pair or a pair of metal oxides with different stages of oxidation. In this case, the metal on which the redox pair is based may for example be iron (Fe), nickel (Ni), copper (Cu), manganese (Mn) or vanadium (V).

The lattice structure of a storage element according to the invention may, for example, be produced by means of a film technology, while using placeholders for cavities or a lost mold. The placeholders can then be removed after the creation of a film stack, for example by burning out or etching out. Alternatively, the lattice structure may be produced by using screen printing, slip casting or direct structuring methods (rapid prototyping). In particular by using these methods, the storage element can be mass-produced. Furthermore, production that allows good reproduction, is flexible and inexpensive is possible. Moreover, the storage element can be produced with a large number of different redox pairs, in particular a large number of metal-based redox pairs.

A solid electrolyte energy store according to the invention comprises a storage element according to the invention. The advantages that can be achieved with such a solid electrolyte energy store result directly from the advantages described with reference to the storage element.

The solid electrolyte energy store according to the invention may comprise in particular:

A first electrode, which is arranged in such a way that a process fluid can be conducted along it, and which comprises a material which, while giving off electrons to a constituent of the process fluid, can generate anions from this constituent or, while taking up electrons from anions, can consume the latter by neutralizing their charge and giving it off to the process fluid.

A second electrode, which comprises a material which, while giving off electrons, can generate anions or, while taking up electrons, can consume anions.

An electrolyte, which is arranged between the first electrode and the second electrode and conducts anions.

A fluidic redox pair, which is located between the second electrode on the one hand and the storage element on the other hand and comprises a fluidic oxidation reactant and a fluidic oxidation product.

Then, when discharging the energy store, in the fluidic redox pair the fluidic oxidation product is reduced to the fluidic oxidation reactant at the oxidation reactant of the storage element, while generating the oxidation product of the storage element, and the fluidic oxidation reactant is oxidized to the fluidic oxidation product at the second electrode by means of the anions, while giving off electrons to the second electrode. By contrast, when charging the energy store, the fluidic oxidation reactant is oxidized to the fluidic oxidation product at the oxidation product of the storage element, while generating the oxidation reactant of the storage element, and the fluidic oxidation product is reduced to the fluidic oxidation reactant at the second electrode, anions being generated at the second electrode, while taking up electrons from the second electrode.

The fluidic redox pair may in particular be gaseous. A suitable gaseous redox pair is, for example, hydrogen as the fluidic oxidation reactant and water vapor as the fluidic oxidation product.

BRIEF DESCRIPTION OF THE DRAWINGS

Further features, properties and advantages of the invention emerge from the following description of exemplary embodiments with reference to the accompanying figures.

DETAILED DESCRIPTION OF INVENTION

Figure 1:
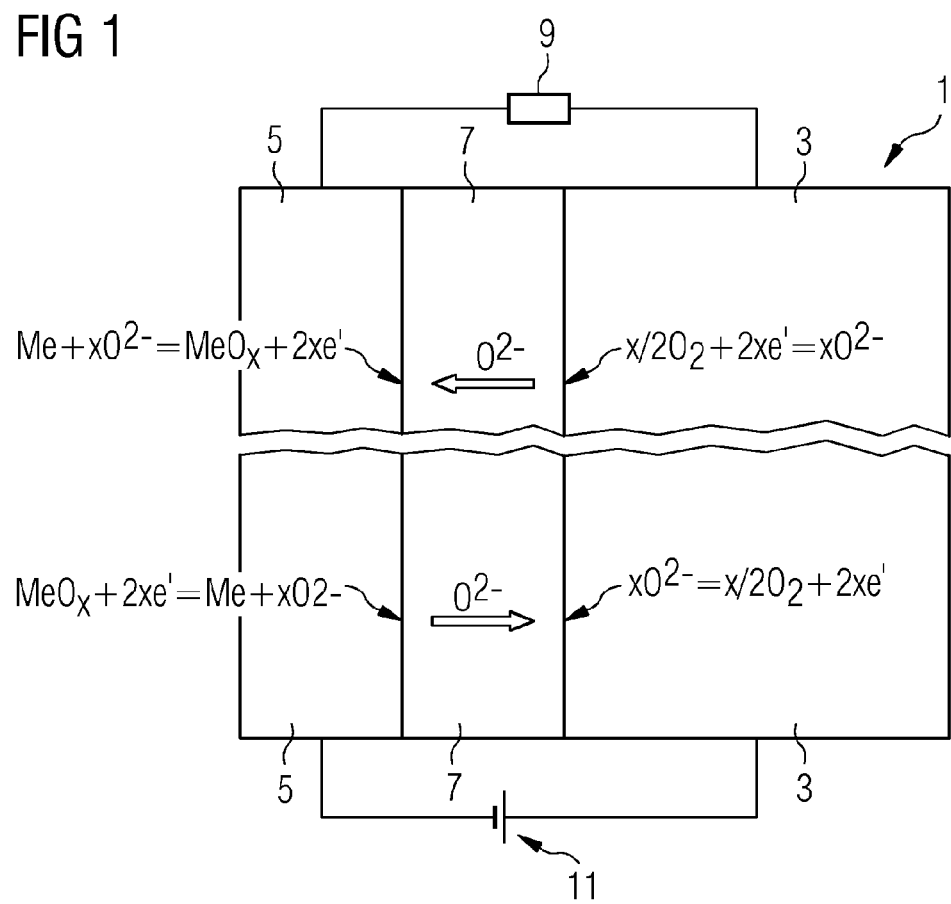
FIG. 1 shows the charging and discharging of an energy store based on the oxidation and reduction of a metal.

The basic structure of the solid electrolyte energy store according to the invention and also the charging process and the discharging process are explained in more detail below with reference to FIGS. 2 and 3. The explanation is provided here on the basis of an example of a solid electrolyte energy store in which oxygen-containing process gas, typically air, is used as the process fluid.

The solid electrolyte energy store that is shown comprises as the main components an air electrode 12, a second electrode 14, a solid electrolyte 16, arranged between the two electrodes 12, 14, a storage element 18 with a redox pair, a process fluid channel 20, which in the present exemplary embodiment is a process gas channel, and a hydrogen/water vapor channel 22. Also present are interconnectors 24a, 24b, one of which is in electrical contact with the air electrodes 12 and one of which is in electrical contact with the second electrodes 14, and which are insulated with respect to one another.

Often, a number of the solid electrolyte energy stores described are combined to form an energy store stack, also known as a cell stack. At the two ends of the cell stack there are end plates. While the one end plate electrically contacts the interconnector 24a that is in connection with the air electrode 12, the other end plate contacts the interconnector 24b that is in connection with the second electrode 14. The end plates also have electrical terminals 24c, 24d, which make it possible for the circuit to close outside the energy store. Furthermore, like the edges of the interconnectors 24a, 24b, the end plates may be part of a housing surrounding the cell stack.

In the present case, the metal of the store 18 has by way of example a bivalent valency. However, other valencies are also possible in principle. Suitable oxidation states have, for example, iron (Fe) and nickel (Ni), but also copper (Cu), manganese (Mn), vanadium (V), etc. The metal represents the oxidation reactant of the redox pair in the storage element that is used for the energy storage. The oxidation product is then the metal oxide; for example, when iron is used, iron(II) oxide (FeO).

The air electrode (first electrode) 12 serves for various purposes. It exchanges molecular oxygen with the process gas, electrons with the interconnector 24a or the assigned end plate and oxygen ions with the electrolyte. The requirements for the material and structure and also technical solutions are known from the prior art with respect to high-temperature fuel cells (Solid Oxide Fuel Cells, SOFC). An example of a material that meets the requirements is, for example, lanthanum-strontium-manganite, LSM for short.

In the present exemplary embodiment, the solid electrolyte 16 may also be produced from scandium-stabilized or yttrium-stabilized zirconia (ScSZ, YSZ). It is moreover also possible that it is produced from a combination of these two materials. Such solid electrolytes display a highly selective oxygen-ion conduction, but require relatively high operating temperatures of typically at least 600° C. It should be pointed out at this stage that iron(II) oxide (FeO), in which iron is present as a bivalent metal, is stable at these temperatures.

In a way similar to in the case of the air electrode 12, for the second electrode 14 there are requirements for the material and structure and also technical solutions that are known from the prior art with respect to high-temperature fuel cells (Solid Oxide Fuel Cells, SOFC). Examples of materials that meet the requirements are porous nickel (Ni) or Ni/YSZ cermet.

The energy store additionally comprises a fluidic redox pair, which is in connection both with the storage element 18 and with the second electrode 14. In the present exemplary embodiment, the fluidic redox pair comprises hydrogen as the oxidation reactant and water vapor as the oxidation product.

Figure 4:
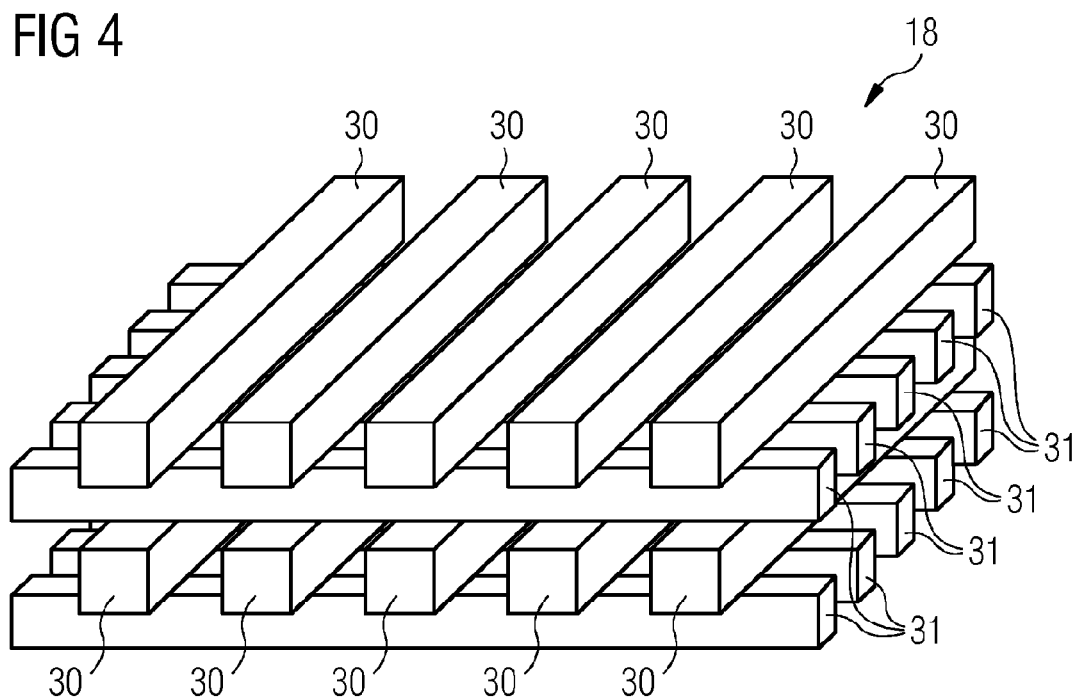
FIG. 4 shows an exemplary embodiment of a storage element of the solid electrolyte energy store.

The structure of the storage element 18 is represented in FIG. 4. It is made up of layers of redox pair elements 30, 31 in rod form that are stacked one on top of the other. The redox pair elements 30, 31 in rod form within one layer are respectively aligned parallel to one another. In this case, the orientation of the alignment of one layer differs from the orientations of the neighboring layers. In the present exemplary embodiment, the orientations are respectively turned by 90° with respect to one another, so that the next-but-one layer following a layer again has the same orientation. In principle, however, there may also be other turned orientations, for example respectively by 60° instead of by 90°, so that in each case it is only the third-next layer that again has the same orientation as the layer taken as the starting point. In this way, a variation of the orientation with a period in the stacking direction is obtained in the stack. In principle, however, stacking without a periodic structure in the orientation is also possible.

The lattice structure of the storage element 18 has a large surface, it being possible for each surface region to be easily reached by the fluidic redox pair on account of the flow paths that are provided by the lattice interspaces. As a result, uniform use of the entire storage element is made possible, i.e. the oxide that forms when discharging the energy store is distributed largely uniformly in the redox pair of the lattice structure. The uniform distribution also has the effect of avoiding the formation of gradients and chemical potentials on account of oxide accumulations in the storage element which in turn may lead to undesired transporting effects.

Prior to sintering, the storage element is built up by stacking films, which contain the placeholders.

The lattice structure that is shown in FIG. 4 may be produced for example by means of film technologies and the inclusion of organic placeholders that can be burned out and provide the desired cavity structures after the sintering. Instead of placeholders that can be burned out, placeholders that can be removed by a chemical etching process after the sintering may possibly be used. Prior to sintering, the storage element is built up by stacking films, which contain the placeholders.

As an alternative to film technology, screen printing methods, slip casting methods or rapid prototyping methods may also be used. If a casting method is used, it may in particular be a method with a lost mold.

With the methods described, macroscopic lattice structures with a height of up to several millimeters and any desired base area can be constructed. Typical lattice structures have a height of 1 to 3 mm.

Figure 2:
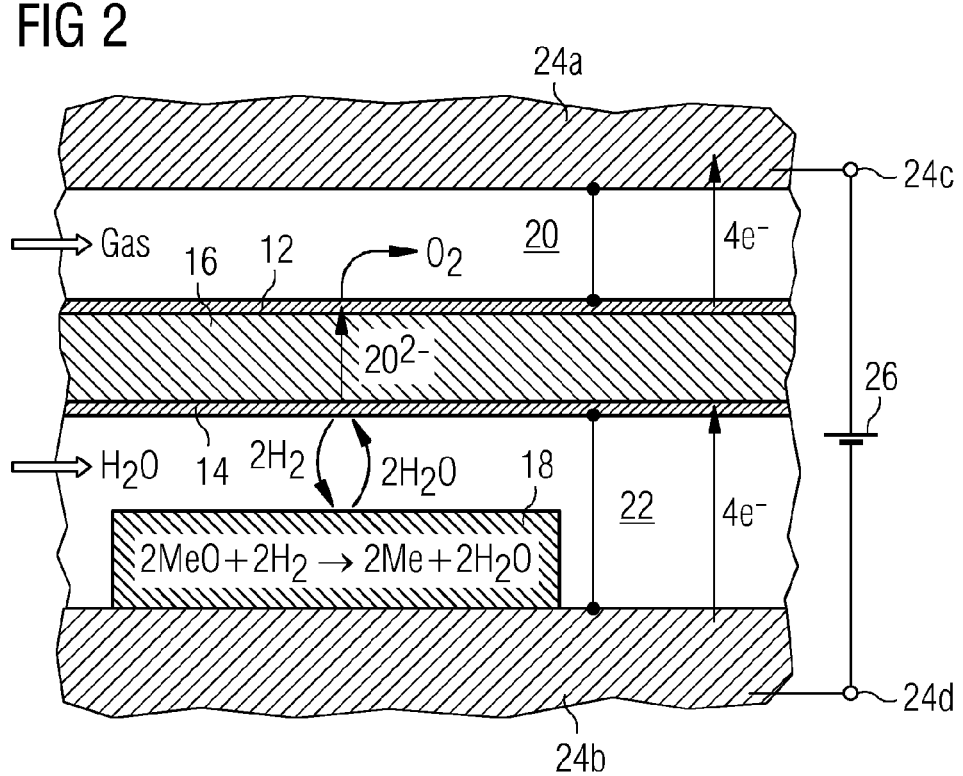
FIG. 2 schematically shows the internal structure of a solid electrolyte energy store according to the invention and also the charging process.

The internal processes during the charging of the energy store are shown in FIG. 2. As represented in FIG. 2, the energy store is connected to a direct-current voltage source 26 by way of the interconnectors 24a, 24b, the end plates (not shown) and the incoming and outgoing electric leads 24c, 24d. Here, the negative terminal of the direct-current voltage source 26 is connected by way of the electrical contact 24d to the interconnector 24b that is in connection with the second electrode 14, the positive terminal is connected by way of the electrical contact 24c to the interconnector 24a that is in connection with the air electrode 12. As a result, the second electrode 14 is supplied with electrons, which lead to the occurrence there of an electrolysis of the water vapor, with oxygen ions OT being formed at the second electrode 14 by means of the electrons supplied and being passed on into the electrolyte. The oxygen ions are passed on from the electrolyte 14 to the air electrode 12, where they form molecular oxygen while giving off electrons and the molecular oxygen is given off to the process gas channel 20 and carried away by it. The electrons given off by the oxygen ions in the air electrode 12 are passed on to the direct current source 26, and so the circuit is closed. The hydrogen produced in the water vapor channel 22 by the electrolysis reduces the metal oxide of the storage element 18, it being oxidized again into water vapor, which can then in turn be subjected to the electrolysis at the second electrode 14. This process continues until there is no more metal oxide left in the storage element 18, or there is only so little metal oxide that no further reduction takes place. After this, the energy store is fully charged.

Figure 3:
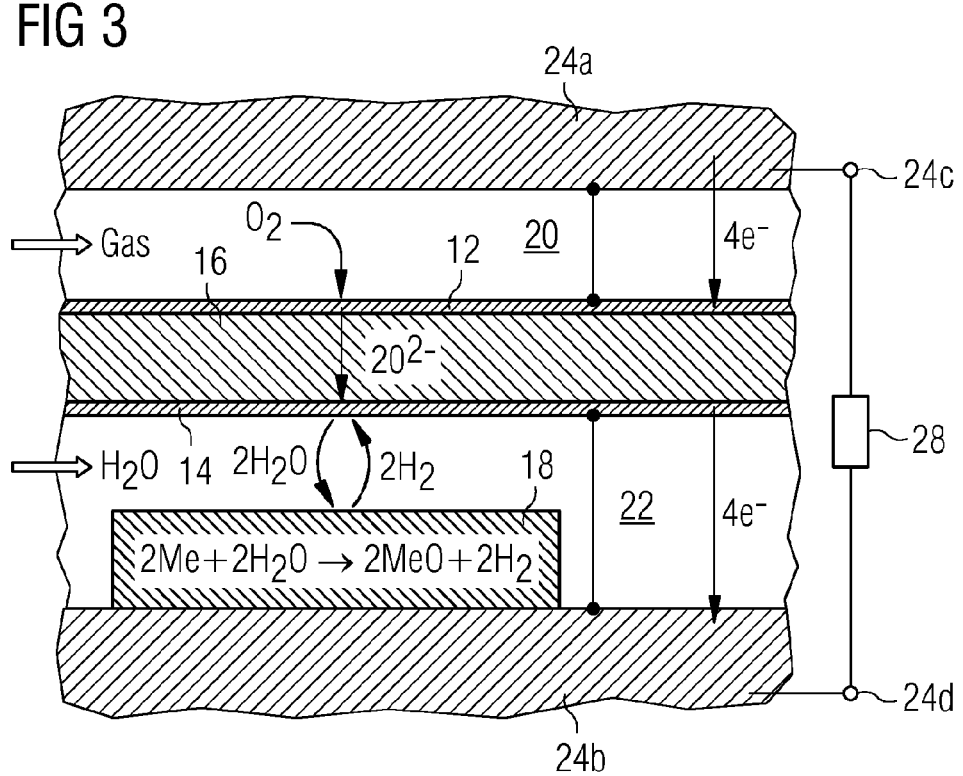
FIG. 3 shows the discharging process of the solid electrolyte energy store from FIG. 2.

The discharging of the energy store is shown in FIG. 3. When discharging, instead of the direct current source 26, a load, represented in FIG. 3 by a resistor 28, is connected into the circuit. For the discharging, the air electrode 12 is supplied with air by way of the process gas channel 20, the air electrode 12 dissociating the atmospheric oxygen and forming oxygen ions $O2^-$. Electrons are thereby taken from the air electrode 12, and so a positive potential forms at the latter. The oxygen ions are passed on by the electrolyte 16 to the second electrode 14. There, they oxidize hydrogen to water vapor, electrons being given off to the second electrode 14, and so a negative potential forms there. The water vapor produced then in turn oxidizes the metal of the storage element 18 to metal oxide, the water vapor being reduced to hydrogen, which can be oxidized again at the second electrode 14. A load 28 can be connected by way of the electrical contacts 24c, 24d on the end plates. The excess electrons present in the second electrode 14 can then flow by way of the interconnector 24b and the assigned electrical contact 24d to the load and from there by way of the electrical contact 24c and the interconnector 24a connected to the latter to the air electrode 12. This process can continue until further oxidation of the storage element 18 is no longer possible and the energy store is consequently discharged.

Although the invention has been described on the basis of actual exemplary embodiments for purposes of illustration, the invention should not be restricted to these exemplary embodiments. In particular, deviations from the exemplary embodiments given by way of example are possible. Thus, instead of water vapor and hydrogen, some other fluidic redox pair may be present. For example, it would be conceivable to use methane ($CH_4$) as the oxidation reactant. Oxidation products would then be water vapor and carbon dioxide, and so there would be two oxidation products. Where the redox pair is mentioned in the context of the present invention, this term is also intended to include the case where more than one oxidation product and/or more than one oxidation reactant is present in the redox pair. Similarly, the oxidation agent is not necessarily atmospheric oxygen. Other gases or liquids that form anions may also be used for the oxidation. Instead of twice negatively charged oxygen ions, the oxidation then takes place on the basis of some other singly or multiply negatively charged ion, for example $CO_3^{2-}$ or $PO_4^{3-}$. Moreover, other elements or compounds that form anions, for instance fluorine or chlorine and also fluorine or chlorine compounds, may also be used for the oxidation. However, atmospheric oxygen is particularly suitable as the oxidation agent since it is abundantly available everywhere and does not have any environmental impact.

The invention claimed is:

1. A storage element for a solid electrolyte energy store, comprising a three-dimensional lattice structure wherein the lattice structure is composed of plural layers, wherein each layer comprises plural elements;
   wherein each element comprises a material that comprises an electron-conducting redox pair, wherein the redox pair comprises at least one metal/metal oxide pair or a pair of metal oxides with different stages of oxidation; and
   wherein each layer comprises elements in a form of a straight rod, wherein each rod is separated from other rods in a respective layer.

2. The storage element as claimed in claim 1, wherein each layer comprises elements in rod form, and wherein the elements in rod form within a respective layer are aligned along a preferential direction and the preferential directions of neighboring layers differ from one another in their orientations.

3. The storage element as claimed in claim 2, in which the preferential directions of neighboring layers respectively differ from one another by a predetermined angle.

4. The storage element as claimed in claim 3, in which the predetermined angle is a divisor of 180 degrees.

5. The storage element as claimed in claim 4, in which the predetermined angle is 90 degrees.

6. The storage element as claimed in claim 1, in which the metal on which the redox pair is based is iron, nickel, copper, manganese or vanadium.

7. A solid electrolyte energy store with a storage element as claimed in claim 1.

8. The solid electrolyte energy store as claimed in claim 7, comprising:
   a first electrode, which is arranged in such a way that a process fluid can be conducted along it, and which comprises a material which, while giving off electrons to a constituent of the process fluid, can generate anions from this constituent or, while taking up electrons from anions, can consume the latter by neutralizing their charge and giving it off to the process fluid;
   a second electrode, which comprises a material which, while giving off electrons, can generate anions or, while taking up electrons, can consume anions;
   an electrolyte, which is arranged between the first electrode and the second electrode and conducts anions; and
   a fluidic redox pair, which is located between the second electrode on the one hand and the storage element on the other hand and comprises a fluidic oxidation reactant and a fluidic oxidation product and in which,
   when discharging the energy store, the fluidic oxidation product is reduced to the fluidic oxidation reactant at the oxidation reactant of the storage element, while generating the oxidation product of the storage element, and the fluidic oxidation reactant is oxidized to the fluidic oxidation product at the second electrode by means of the anions, while giving off electrons to the second electrode, and,
   when charging the energy store, the fluidic oxidation reactant is oxidized to the fluidic oxidation product at the oxidation product of the storage element, while generating the oxidation reactant of the storage element, and the fluidic oxidation product is reduced to the fluidic oxidation reactant at the second electrode, anions being generated at the second electrode, while taking up electrons from the second electrode.

9. The solid electrolyte energy store as claimed in claim 8, in which the fluidic redox pair is gaseous.

10. The solid electrolyte energy store as claimed in claim 9, in which the fluidic redox pair comprises hydrogen as the fluidic oxidation reactant and water vapor as the fluidic oxidation product.

11. A method for producing a storage element as claimed in claim 1, comprising:
    producing the lattice structure by a film technology, while using placeholders for cavities.

12. A method for producing a storage element as claimed in claim 1, comprising:
    producing the lattice structure by using screen printing, slip casting or direct structuring methods.

* * * * *